H. A. CHRISTY.
DRAFT GEAR.
APPLICATION FILED JUNE 30, 1915.
1,165,751.
Patented Dec. 28, 1915.
2 SHEETS—SHEET 1.
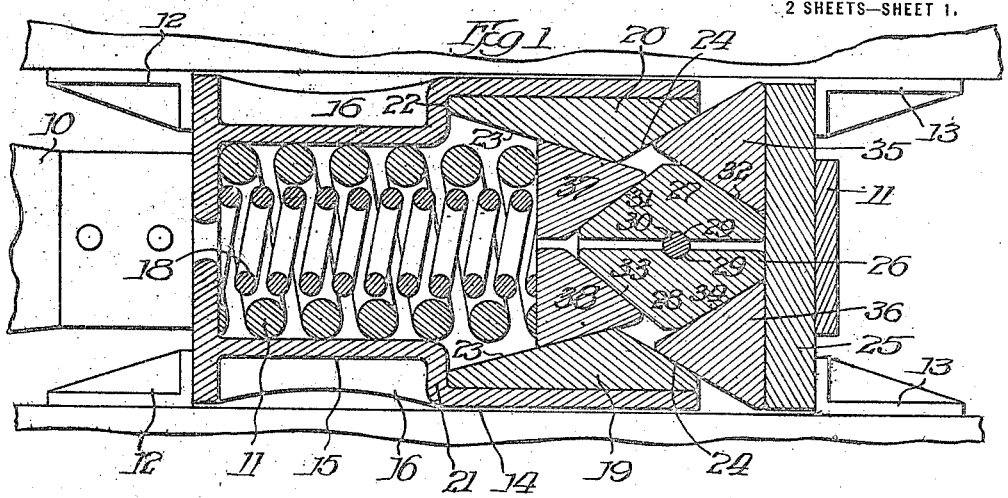
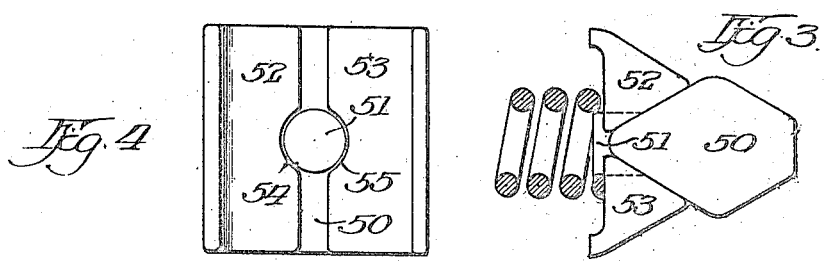
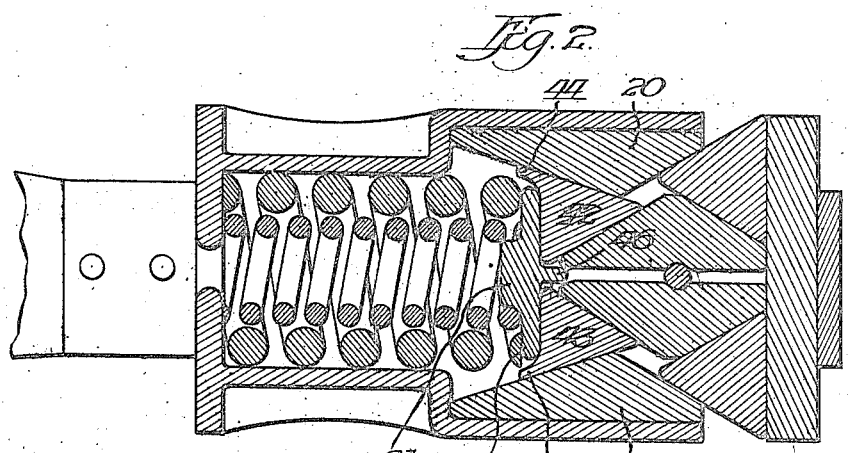
Inventor:
Henry A. Christy
By Walter M. Fuller
Atty.
Witnesses:

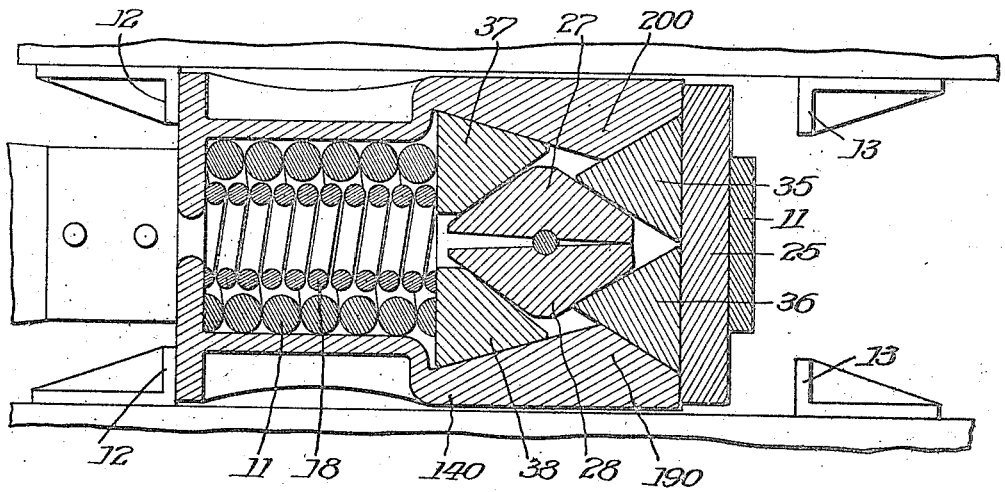
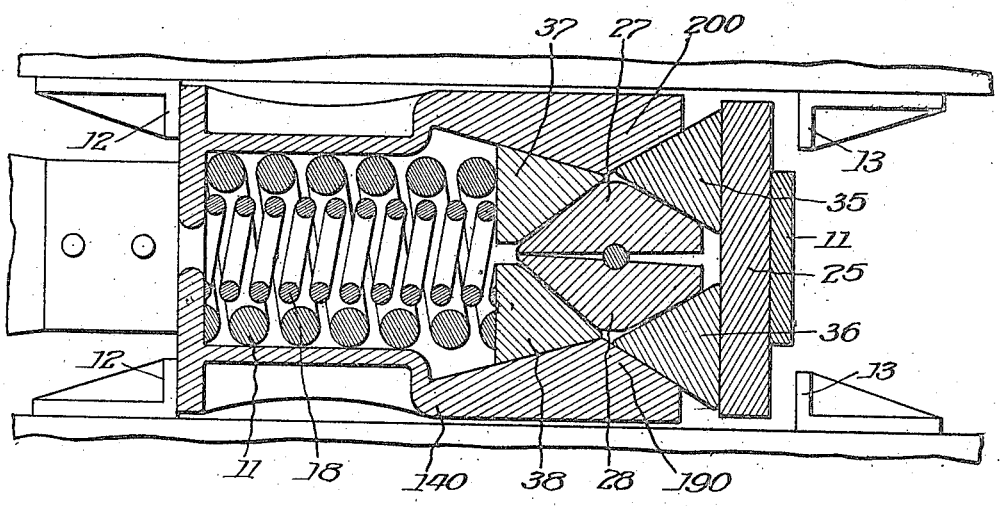

UNITED STATES PATENT OFFICE.

HENRY A. CHRISTY, OF KENILWORTH, ILLINOIS, ASSIGNOR TO AMERICAN CAR ROOF CO., OF CHICAGO, ILLINOIS, A CORPORATION OF ILLINOIS.

DRAFT-GEAR.

1,165,751.  Specification of Letters Patent.  Patented Dec. 28, 1915.

Application filed June 30, 1915. Serial No. 37,166.

*To all whom it may concern:*

Be it known that I, HENRY A. CHRISTY, a citizen of the United States, residing at Kenilworth, in the county of Cook and State of Illinois, have invented certain new and useful Improvements in Draft-Gears, of which the following is a specification.

The improvement of the construction and operation of friction draft-rigging for railway-cars constitutes the subject-matter of the present invention, although the principles involved are susceptible of employment in other relations.

Briefly stated, one of the objects of the invention is the provision of a novel structure of this character which will occupy but small space and wherein the spring compression is reduced over that of the devices of the same general character now in use and in which the housing of the appliance is not subjected to wear. The parts of the mechanism are so designed that as wear occurs they may be shimmed out and also readily replaced at small expense if worn beyond further usefulness.

One of the leading aims of the invention is to decrease the travel of the springs in appliances of this general form, which, besides permitting reduction in the size of the structure, diminishes the tendency of the springs to become permanently set. Furthermore, even though the appliance is of restricted compass, I am enabled to increase the number of friction surfaces which act efficiently as a shock absorber without recoil.

Among the prime features of the invention may be also included improved means for facilitating the release of the wedge or friction members, and, in some forms of the structures, such means also acts to compensate for foundry or casting imperfections in the shapes of the coöperating parts of the appliance.

The attainment of these and other objects will be readily understood by those skilled in this art from the following detailed descriptions of several embodiments thereof, which specification of their structures should be read in connection with the accompanying drawing illustrating the devices, and throughout the various views of which like reference characters refer to the same parts.

Referring to the drawing: Figure 1 is a horizontal section illustrating a draft-gear incorporating a desirable embodiment of this invention; Fig. 2 is a similar view of a modified structure; Fig. 3 is a fragmentary plan view of a still further modification; Fig. 4 is an end elevation of the parts shown in Fig. 3, with the portion of the spring omitted; Fig. 5 illustrates a structure like that of Fig. 1, except that the pressure-blocks are integral with the housing, this view showing the elements at their forward limit of travel; and Fig. 6 is a view of the same structure showing the parts receding under the expanding action of the springs.

Referring to the structure illustrated in Fig. 1, it will be observed that in addition to the coupler-shank 10 and the usual yoke or strap 11 secured thereto, there are shown the usual front and rear draft-sill stops 12, 12, and 13, 13, respectively. The draft-rigging proper comprises a cast-metal casing or housing 14, the forward end of which is adapted to coöperate with the pair of draft-sill stops 12, 12, as shown. One portion of this housing is reduced in size at 15 and is strengthened by means of external outstanding ribs 16, 16, and such portion of the housing contains the outer and inner springs 17 and 18 which at one end bear against the end-wall of the housing, as illustrated. This casing or shell accommodates two pressure or wear blocks 19 and 20 bearing against the inner faces of the walls thereof, and their ends are adapted to coöperate with the casing-shoulders 21 and 22 respectively. Each of these wear or pressure members is reversely beveled providing the two diverging surfaces 23 and 24. The yoke or strap 11 coöperates with a follower 25 which, as shown, co-acts with the two draft-sill stops 13, 13. In front of this follower there is a divided double-wedge characterized as a whole 26, composed of two double-wedge members 27 and 28, each provided centrally with a bearing 29 accommodating a fulcrum or pivot pin 30. These two members are spaced apart from one another, as shown, and the member 27 is provided with two wedge or bevel surfaces 31 and 32, while the companion member 28 has corresponding wedge surfaces 33 and 34. That is to say, each member is a double wedge and the two members together constitute a divided double-ended-wedge, of which the two parts are adapted to rock on the common fulcrum-pin 30. In the inoperative condition of the parts the inner ends of the wedge-members 27 and 28 may, if desired, contact with the front face of the follower 25, as shown. This follower also has in front of and bearing against it, two forwardly-facing wedges 35 and 36, of which the former is associated between the diverging surfaces 24 and 32 of the pressure-block and intermediate-wedge respectively, the companion wedge 36 being received between the corresponding surfaces 24 and 34. Between the intermediate double-ended wedge 26 and the springs, I interpose two other rearwardly-facing companion wedges 37 and 38, the former being received between the diverging surfaces 23 and 31, the latter being accommodated between the surfaces 23 and 33.

The operation of this appliance takes place substantially as follows: Assuming that the coupler is pulled outwardly, that is, to the left as the parts are viewed in Fig. 1, the housing 14 remains stationary, owing to its engagement with the fixed draft-sill stops 12, 12, but the strap or yoke 11 carries the follower 25 forwardly away from the stops 13, 13. Inasmuch as the wear or pressure blocks 19 and 20 are immovable relatively to their incasing housing, as the follower travels outwardly the wedges 35 and 36 and the intervening divided double-wedge 26 move in the same direction, but owing to the angles of the surfaces of the parts, the member 26 travels approximately twice as rapidly, that is, twice as far as the wedges 35 and 36, and during such movement the front wedge end of the split member 26 not only pushes the wedges 37 and 38 forwardly or to the left against the action of the springs, but these two wedges separate under the spreading action of the intermediate wedge 26 and travel down the surfaces 23, 23, of the wear or pressure blocks 19 and 20. During such movement of the parts, owing to the converging surfaces 24, 24, the two wedges 35 and 36 approach one another, sliding crosswise on the front face of the follower, in this way not only pushing the intermediate, divided wedge toward the springs, but also rocking the two parts 27 and 28 somewhat on their fulcrum 30. The two wedges 37 and 38 travel a less distance than the divided wedge 26 owing to the selected angles of the coöperating parts, and, if desired, their travel may be substantially equal to that of the wedges 35, 36, or, stated in other words, their travel may be approximately one-half that of the split wedge 26. Of course, the extent of travel of these various coacting wedges depends upon the angles of their various surfaces.

It should be observed that the wedge 35 has a friction travel laterally on the follower 25 and a travel on the two members 20 and 27. Similarly, the wedge 36 has a sliding friction movement on the follower 25 and also on the parts 19 and 28. In turn, the wedge 37 has a sliding frictional engagement with the parts 20 and 27 and the springs and the wedge 38 has a like engagement with the parts 19 and 28 and the springs. In this way, an adequate friction or resistance is secured between these various elements to absorb the shocks without recoil. As soon as the strain on the coupler is released, owing to the ready contraction of the expanded front portion of the split wedge, the latter acts as an instant release wedge, for the coöperating friction elements, and, in addition to having such function, it also compensates for any irregularities in the proper shapes of the coacting parts, that is to say, in supplement to its action as a quick release for the frictional wedge instrumentalities it acts as a compensator and accommodates itself to the shapes of the parts with which it coöperates.

In case the coupler and yoke are forced inwardly, as in coupling cars, the follower remains stationary and the housing and its contained parts travel inwardly or rearwardly, but the action of the draft gear elements is otherwise substantially as indicated above.

It will be observed that in the structure depicted in Fig. 1, the springs bear directly against the flat faces of the companion wedges 37 and 38, but in Fig. 2 I have shown a somewhat modified structure wherein the inner ends of the springs are provided with a cap 40 having a central boss 41, which acts to center the inner spring. The wedges 42 and 43 corresponding to the wedges 37 and 38 instead of bearing directly on the ends of the springs coöperate with the face of this cap 40 and are somewhat elongated at 44 and 45 to have an effective bearing on the two pressure blocks 19 and 20. If desired, the member 40 may be equipped with a rib 46 extending between the wedges 42 and 43 and also between the parts of the divided wedge 26, such rib assisting in maintaining the cap 40 in central position. In this embodiment of the invention the wedges 42 and 43, instead of traveling crosswise with a friction bearing directly on the ends of said springs, they have similar movement on the face of the part 40, all as will be readily understood from the above description. In Figs. 3 and 4 I have shown a still further modification wherein the double-ended intermediate-wedge 50 is not necessarily longitudinally split or divided and is provided on one end with a boss 51 acting as a centering means for the spring, and in order to accommodate such boss the adjacent faces of the two wedges 52 and 53 are cut away at 54 and 55, the boss 51 projecting beyond the wedges sufficiently to properly coact with the end of the spring.

The appliance shown in Figs. 3 and 4 is like those presented in Figs. 1 and 2 with the exceptions noted but, where the intermediate wedge is not made in two parts, the device would probably not release the wedge surfaces with as great facility as in the other structures.

In all of these structures it will be observed that no wear takes place on the housing itself and that the blocks 19 and 20 as they become worn may be shimmed out from the housing and, if they become sufficiently worn so as to need replacement, this can be effected easily and economically. Also the wear on the various wedges will, to a certain extent, be automatically taken up, and if they become worn unduly they also can be replaced with facility.

In Figs. 5 and 6 a somewhat modified form of structure is shown, all of the elements being the same as in the appliance of Fig. 1, except that in this case the housing 140 has cast integral therewith the two oppositely-beveled portions 190 and 200, which correspond to the separate pressure-blocks of the appliance of Fig. 1. Fig. 5 shows how, during the outward travel of the parts, the companion wedges 35 and 36 act to rock the two parts 27 and 28 on one another, opening up their forward ends as shown, and in Fig. 6, I have illustrated the manner in which the wedges 37 and 38 operate to rock the parts 27 and 28 in the opposite direction during the expansion of the springs.

In all of these appliances when the device is manipulated to compress the springs, the pair of wedges 35 and 46 predominate in their friction, but when the springs are expanding, as shown in Fig. 6, the friction of the wedges 37 and 38 predominates. Or, stated somewhat differently, during the compression of the springs, the wedges 35 and 36 are entering wedges and the wedges 37 and 38 are receding or retracting wedges, but when the parts travel in the opposite direction under the expansion of the cushion springs, then the wedges 37 and 38 are entering and the wedges 35 and 36 are retracting or backing away. It is due to this relation and action of the parts that the friction of the wedges 35 and 36 predominates in one instance, while in the other case, the friction of the other wedges 37 and 38 prevails or preponderates.

Although I have herein set forth with some degree of particularity three embodiments of the invention, it is to be understood that the invention is susceptible of several other embodiments and that various minor mechanical changes may be made in the structure illustrated and described without departure from the substance and heart of the invention and without the sacrifice of any of its substantial benefits and advantages.

I claim:

1. In a railway-car draft-gear, the combination of a housing adapted to coöperate with draft-sill stops, and a friction appliance including a pressure-block bearing against said housing, a spring, an intermediate wedge-member, a wedge acted upon by said spring and located between said intermediate wedge-member and said pressure-block, and a companion wedge adapted to be operatively associated with the opposed draft-sill stops and located between said pressure-block and said intermediate wedge-member, substantially as described.

2. In a railway-car draft-gear, the combination of a housing adapted to be operatively associated with draft-sill stops, a pair of pressure-blocks adapted to bear against said housing, a spring, an intermediate double-wedge member, a pair of wedges acted upon by said spring and each interposed between one side of said wedge-member and its respective pressure-block, and a second pair of wedges adapted to be operatively associated with the opposed draft-sill stops and each interposed between one side of said double wedge-member and the corresponding pressure-block, substantially as described.

3. In a railway-car draft-gear, the combination of a housing adapted to coöperate with draft-sill stops and a friction appliance including a pressure-block bearing against said housing, a spring, a pivoted wedge-member, a wedge acted upon by said spring and located between said pivoted wedge-member and said pressure-block, and a companion wedge adapted to be operatively associated with the opposed draft-sill stops and located between said pressure-block and said pivoted wedge-member, substantially as described.

4. In a railway-car draft-gear, the combination of a housing adapted to be operatively associated with draft-sill stops, a pair of pressure-blocks adapted to bear against said housing, a spring, an intermediate divided wedge with its two parts constructed to rock on one another, a pair of wedges acted upon by said spring and each interposed between one side of said divided wedge and its respective pressure-block, and a second pair of wedges adapted to be operatively associated with the opposed draft-sill stops and each interposed between one side of said divided wedge and the respective pressure-block, substantially as described.

5. A railway-car draft-gear adapted to be associated with the stops of draft-sills, comprising in combination a housing, a pressure-block movable with said housing, a spring, and a friction appliance including a pivoted quick-release device for said friction appliance, substantially as described.

6. A railway-car draft-gear adapted to be associated with the stops of draft-sills, comprising in combination a housing, a pair of pressure-blocks movable with said housing, a spring, and a friction appliance including two wedge-members pivoted together and adapted to effect a quick-release of the friction appliance, substantially as described.

7. In a railway-car draft-gear, the combination of a housing adapted to be operatively associated with draft-sill stops, and a friction appliance including an oppositely-beveled pressure-block bearing against said housing, a spring, an intermediate wedge-member, a wedge acted upon by said spring and interposed between said wedge-member and one of the beveled faces of said pressure-block, and a companion reversely-arranged wedge interposed between said wedge-member and the oppositely beveled face of said pressure-block and operatively associated with draft-sill stops, substantially as described.

8. In a railway-car draft-gear, the combination of a housing adapted to be operatively associated with draft-sill stops, a pair of oppositely-beveled pressure-blocks bearing against said housing, a spring, an intermediate double-wedge member, a pair of wedges acted upon by said spring and each interposed between said intermediate wedge-member and one of the beveled faces of the corresponding pressure-block, and a companion pair of reversely-arranged wedges operatively associated with draft-sill stops and each interposed between the other wedge-portion of said intermediate member and the oppositely-beveled face of the corresponding pressure-block, substantially as described.

9. In a railway-car draft-gear, the combination of a housing adapted to be operatively associated with draft-sill stops, an oppositely-beveled pressure-block bearing against said housing, a spring, a pivoted intermediate double-wedge member, a wedge acted upon by said spring and interposed between one wedge portion of said member and one of the beveled faces of said pressure-block, and a companion reversely-arranged wedge operatively associated with draft-sill stops and interposed between the other wedge portion of said intermediate member and the other oppositely beveled face of said pressure-block, substantially as described.

10. In a railway-car draft-gear, the combination of a housing adapted to be operatively associated with draft-sill stops, a pair of oppositely-beveled pressure-blocks bearing against said housing, a spring, an intermediate divided double-wedge member the two parts of which are adapted to rock on one another, a pair of wedges acted upon by said spring and each interposed between one wedge portion of said member and one of the beveled faces of the corresponding pressure-block, and a companion pair of reversely-arranged wedges each interposed between the other wedge-portion of said intermediate member and the oppositely-beveled face of the corresponding pressure-block, substantially as described.

11. In a railway-car draft-gear adapted for employment with a car-coupler and its yoke, the combination of a housing adapted to be operatively associated with draft-sill stops, a follower adapted to coöperate with the companion draft-sill stops, a pair of oppositely-beveled pressure-blocks bearing against said housing, a spring accommodated in said housing, a cap for an end of said spring, an intermediate double wedge member, a pair of wedges co-acting with said spring-cap and accommodated between an end of said intermediate wedge-member and the corresponding beveled faces of the pressure-blocks, and a companion pair of reversely-arranged wedges coöperating with said follower and interposed between the opposite wedge-portion of said intermediate member and the oppositely-beveled faces of the corresponding pressure-blocks, said pairs of wedges being adapted to travel transversely on the spring-cap and follower respectively, substantially as described.

12. In a railway-car draft-gear adapted for association with a car-coupler and its yoke comprising in combination, a housing adapted to be operatively associated with draft-sill stops, a follower adapted to co-act with the opposed draft-sill stops, a pair of oppositely-beveled pressure-blocks accommodated in and bearing against said housing, a spring, a cap for said spring, an intermediate divided double-wedge member the two parts of which are constructed to rock on one another, a pair of wedges coöperating with said spring-cap and each interposed between one wedge-portion of said intermediate member, and a beveled face of the corresponding pressure-block, and a companion pair of reversely-arranged wedges coöperating with said follower and each interposed between the opposite wedge portion of said intermediate member and the oppositely-beveled face of the corresponding pressure-block, said pairs of wedges during the actuation of the appliance being adapted to travel laterally on the spring-cap and follower respectively, substantially as described.

13. In a railway-car draft-gear, the combination of a housing adapted to be operatively associated with draft-sill stops, and a friction appliance including a beveled pressure-block bearing laterally against said housing, a spring, an intermediate double-wedge member, a wedge acted upon by said spring and interposed between said intermediate wedge-member and such pressure-block, and a companion reversely-arranged wedge operatively associated with the opposed draft-sill stops and interposed between the other wedge-portion of said intermediate member and the pressure-block, the construction of said appliance causing all of said wedges to travel longitudinally of the device during its operation, substantially as described.

14. In a railway-car draft-gear, the combination of a housing adapted to be operatively associated with draft-sill stops, a pair of beveled pressure-blocks bearing laterally against said housing, a spring, an intermediate double-wedge member, a pair of wedges acted upon by said spring and each interposed between said intermediate wedge-member and the corresponding pressure-block, and a companion pair of reversely-arranged wedges operatively associated with the opposed draft-sill stops and each interposed between the other wedge-portion of said intermediate member and the corresponding pressure-block, the construction of said appliance causing all of said wedges to travel longitudinally of the device during its operation, substantially as described.

15. In a railway-car draft-gear, the combination of a housing adapted to be operatively associated with draft-sill stops, and a friction appliance including a beveled pressure-block bearing laterally against said housing, a spring, an intermediate double-wedge member, a wedge acted upon by said spring and interposed between said intermediate wedge-member and the pressure-block, and a companion reversely-arranged wedge operatively associated with the opposed draft-sill stops and interposed between the other wedge-portion of said intermediate member and said pressure-block, the angles of said wedges and the intermediate member being such that said wedges and member travel longitudinally of the draft-gear at different speeds during the operation of the device, substantially as described.

16. In a railway-car draft gear, the combination of a housing adapted to be operatively associated with draft-sill stops, a pair of beveled pressure-blocks bearing laterally against said housing, a spring, an intermediate split double-wedge member, the two parts of which are adapted to rock on one another, a pair of wedges acted upon by said spring and each interposed between said intermediate wedge-member and the corresponding pressure-block, and a companion pair of reversely-arranged wedges operatively associated with the opposed draft-sill stops and each interposed between the other wedge-portion of said intermediate member and the corresponding pressure-block, the construction of the appliance causing all of said wedges to travel longitudinally of the device during its operation, substantially as described.

17. In a railway-car draft-gear, the combination of a housing adapted to be operatively associated with draft-sill stops, a pair of beveled pressure-blocks bearing laterally against said housing, a spring, an intermediate double-wedge member, a pair of wedges acted upon by said springs and each interposed between said intermediate wedge-member and the corresponding pressure-block, and a companion pair of reversely-arranged wedges operatively associated with the opposed draft-sill stops and each interposed between the other wedge-portion of said intermediate member and the corresponding pressure-block, all of said wedges traveling longitudinally of the appliance during its operation and the angles of the first mentioned pair of wedges being less than the angles of said other pair of wedges and said intermediate double-wedge member, substantially as described.

18. In a railway-car draft-gear, the combination of a housing adapted to be operatively-associated with draft-sill stops, a pair of beveled pressure-blocks bearing laterally against said housing, a spring, a double-wedge member, a pair of wedges acted upon by said spring and each interposed between said intermediate wedge-member and the corresponding pressure-block, and a companion pair of reversely-arranged wedges operatively associated with the opposed draft-sill stops and each interposed between the other wedge portion of said intermediate member and the corresponding pressure-block, all of said wedges traveling longitudinally of the appliance during its operation, the travel of the first mentioned pair of wedges being less than that of the intermediate double-wedge member, substantially as described.

19. In a railway-car draft-gear, the combination of a housing adapted to be operatively associated with draft-sill stops, a pair of beveled pressure-blocks bearing laterally against said housing, a spring, an intermediate split double-wedge member the two parts of which are adapted to rock on one another, a pair of wedges acted upon by said spring and each interposed between said intermediate wedge-member and the corresponding pressure-block, and a companion pair of reversely-arranged wedges operatively associated with the opposed draft-sill stops and each interposed between the other wedge portion of said intermediate member and the corresponding pressure-block, all of said wedges traveling longitudinally of the appliance during its operation, the first mentioned pair of wedges traveling a less distance than said intermediate double-wedge member, substantially as described.

20. In a railway-car draft-gear, the combination of a housing adapted to coöperate with draft-sill stops, and a friction appliance including a pressure block bearing laterally against said housing, an intermediate double-wedge member, a wedge between one wedge-portion of said intermediate member and said pressure-block, a cushion interposed between said wedge and housing, and a reversely-arranged wedge coöperating with the opposed draft-sill stops and interposed between the other wedge-portion of said intermediate member and said pressure-block, the construction causing said latter wedge to predominate in its friction during compression of the cushion, and the first specified wedge to predominate in its friction during expansion of the cushion, substantially as described.

21. In a railway-car draft-gear, the combination of a housing adapted to coöperate with draft-sill stops, a pair of pressure-blocks bearing laterally against said housing, an intermediate double-wedge member, a pair of wedges each interposed between one wedge portion of said intermediate member and the corresponding pressure-block, a cushion between said wedges and housing, a pair of reversely-arranged wedges coöperating with the opposed draft-sill stops and each interposed between the other wedge-portion of said intermediate member and the corresponding pressure-block, the construction causing said latter pair of wedges to predominate in their friction during compression of the cushion and the first specified pair of wedges to predominate in their friction during expansion of the cushion, substantially as described.

22. In a railway-car draft-gear, the combination of a housing adapted to coöperate with draft-sill stops, a pair of beveled pressure-blocks bearing laterally against said housing, an intermediate split double-wedge member, the two parts of which are adapted to rock on one another, a pair of wedges each interposed between one wedge-portion of said intermediate member and the corresponding pressure-block, a cushion between said pair of wedges and housing, and a pair of reversely-arranged wedges coöperating with the opposed draft-sill stops and each interposed between the other wedge-portion of said intermediate member and the corresponding pressure-block, the construction causing all of said wedges to travel longitudinally of the appliance during its operation, the latter pair of wedges to predominate in their friction during compression of the cushion, and the first specified pair of wedges to predominate in their friction during expansion of the cushion, substantially as described.

HENRY A. CHRISTY.

Copies of this patent may be obtained for five cents each, by addressing the "Commissioner of Patents, Washington, D. C."